Oct. 31, 1944.　　　E. M. FERGUSON ET AL　　　2,361,898
VARIABLE SPEED CLUTCH
Filed Jan. 11, 1941　　　5 Sheets—Sheet 3

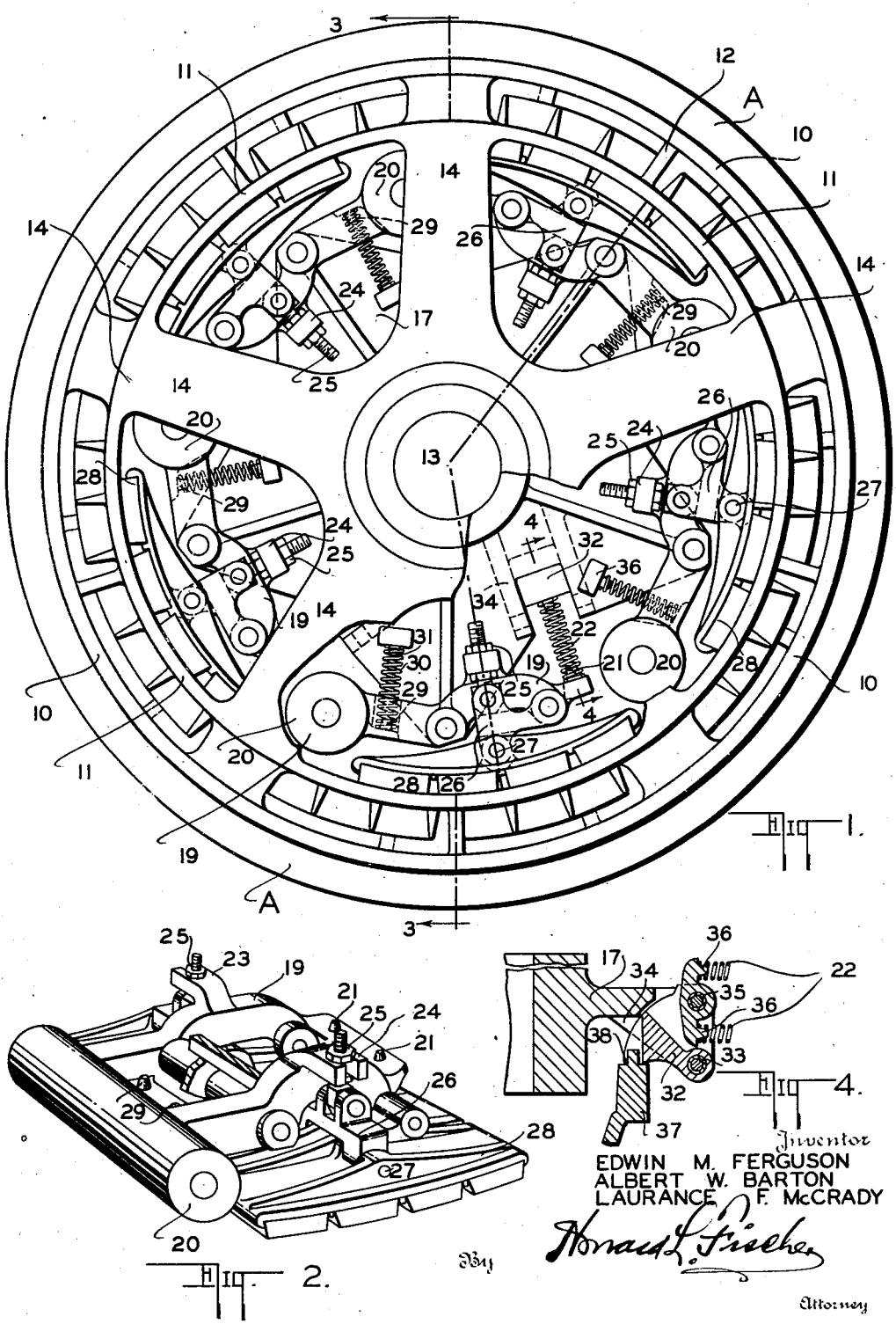

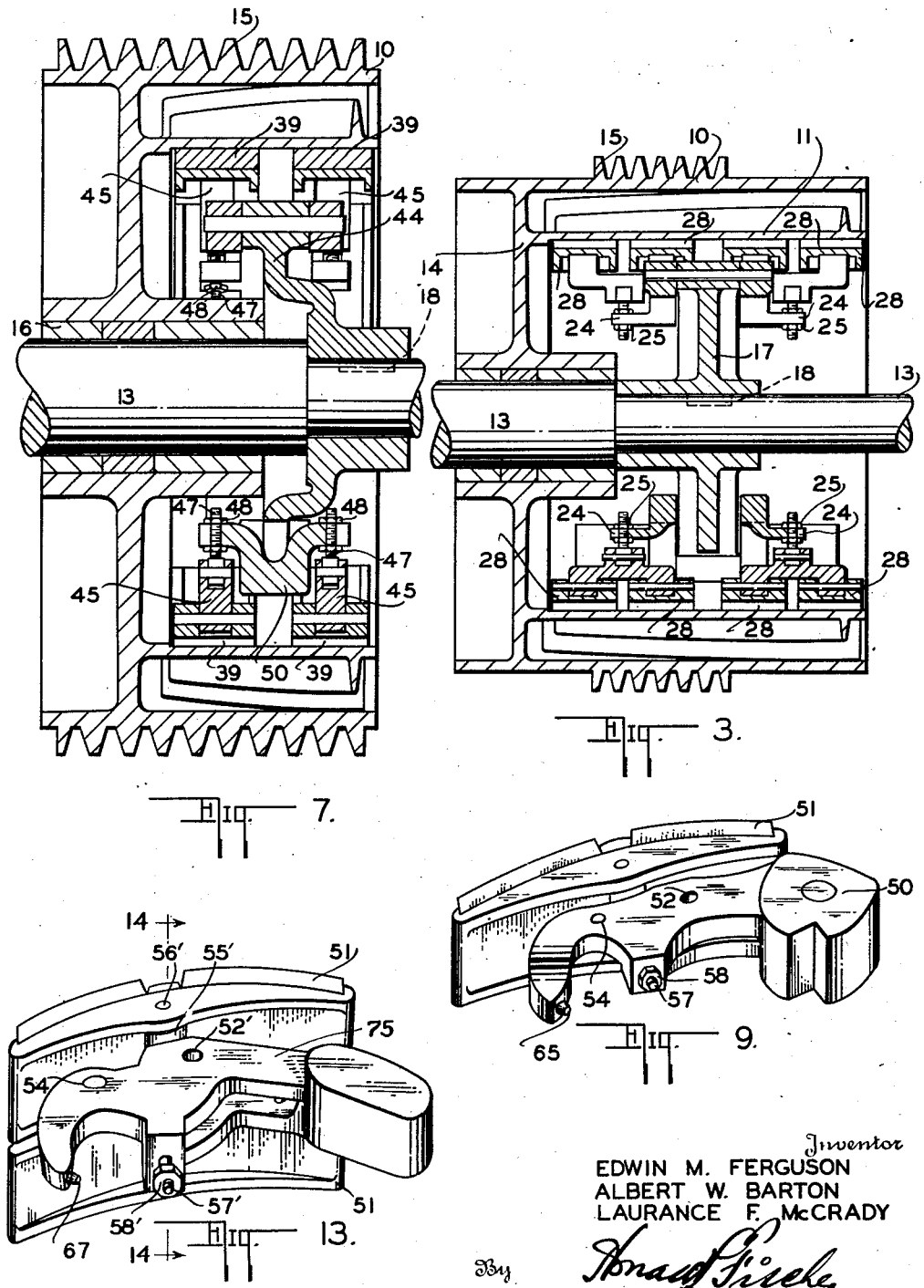

Inventor
EDWIN M. FERGUSON
ALBERT W. BARTON
LAURANCE F. McCRADY

By Howard Fischer
Attorney

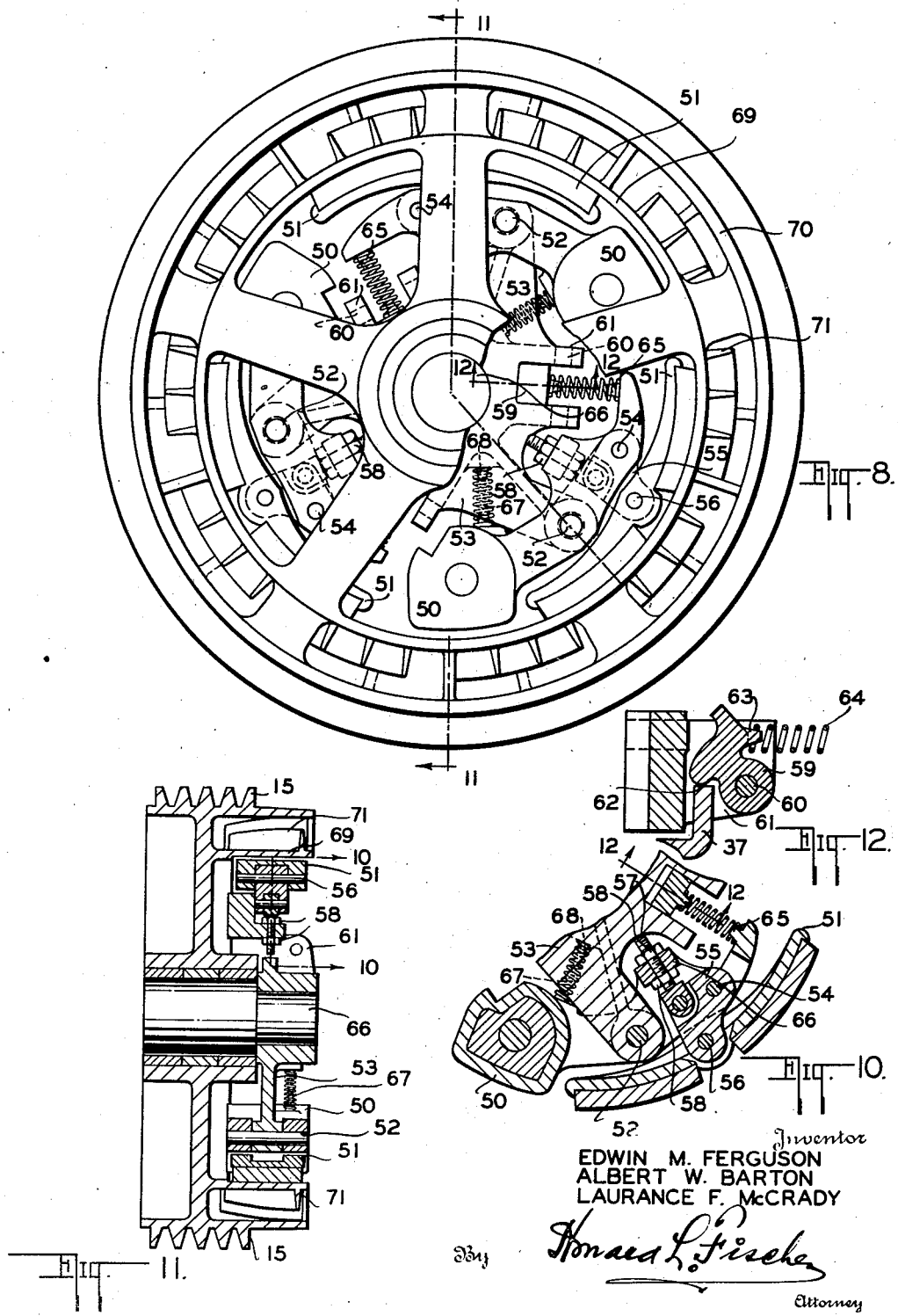

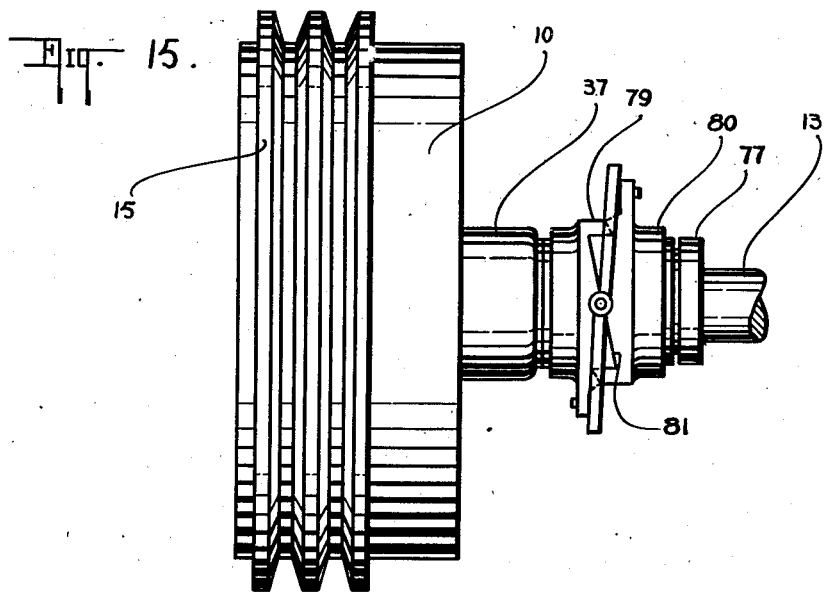
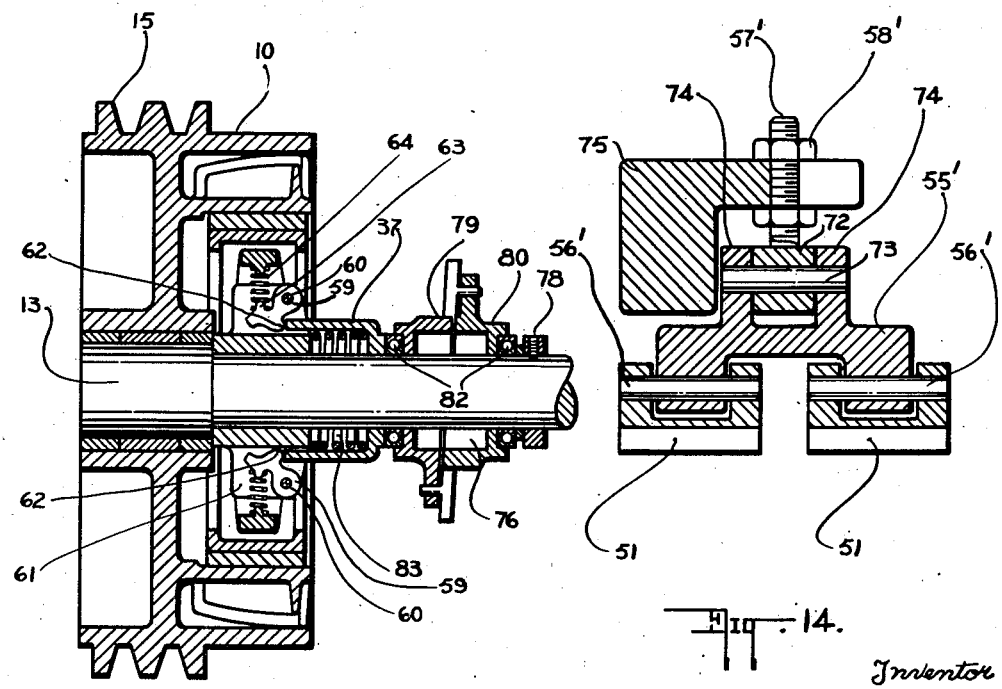
Fig. 15.
Fig. 14.
Fig. 16.
Inventor
EDWIN M. FERGUSON
ALBERT W. BARTON
LAURANCE F. McCRADY
By Howard L. Fischer
Attorney Patented Oct. 31, 1944

2,361,898

UNITED STATES PATENT OFFICE 2,361,898

VARIABLE-SPEED CLUTCH

Edwin M. Ferguson, Albert W. Barton, and Laurance F. McCrady, Minneapolis, Minn., assignors to Horton Manufacturing Company, Minneapolis, Minn., a corporation of Minnesota Application January 11, 1941, Serial No. 374,094

2 Claims. (Cl. 192—75)

This invention relates to a variable speed clutch. Due to its governor control slipping characteristics, this clutch is ideal for transmitting supplemental power to any under-powered driven shaft, as well as main and variable power to any driven shaft. The head of this clutch is keyed to the driven shaft and rotates at shaft speed.

This clutch provides means for reducing to a minimum the time involved in translating governor weight centrifugal changes into changes in frictional engagement with the friction drum, so that any change in the load carried or transmitted by the clutch is taken care of virtually immediately owing to the novel construction of the clutch which transmits the changes which take place more directly to the friction shoes than has been accomplished heretofore with clutches of this nature.

Our clutch is composed of an outside drum which has an outer driving surface and an inner frictional surface on which the friction shoes act. The drum is free to rotate on the drive shaft and therefore can be rotated freely. The outer surface may be gear cut or finished for any type of belt drive.

It is an object to provide a construction of variable speed friction clutch wherein in each of the designs, whether a single row of working units with single shoes are used, or whether the units have pairs of working shoes, or a plurality of working shoes, the construction is such as to keep all of the operating parts toward the periphery, thereby leaving a greater amount of hub stock room, permitting the clutch head to be bored for larger shafting than is possible with former types of friction pulleys. Further, when desirable, we have made the spider hub hat-shaped to bring friction more nearly central with the pulley.

Each working unit is composed of one or more friction shoes differing in the forms shown in the Figures 1, 4, 5, 8, 9 and 12, such as 28, 39, 51 and mounted on links or saddles so as to maintain the angle of thrust between the weight pivot and the rim of the pulley substantially constant, regardless of wear on the friction faces. The friction shoe is connected to weight by means of links or saddles. The releasing governor weight springs are located beneath the governor arm or ball while the equalizer power springs are mounted directly on the pressure end of the weight arm. Thus the bell cranks operate through equalizer power springs direct to the friction shoe or shoes.

Further this invention includes means for transmitting centrifugal changes in the governor weights to the friction shoes without passing through more than one friction connection (weight pin and governor arm), thus reducing to a minimum pivotal friction between governor weights and friction shoe at the fulcrum point.

The invention further includes means for mounting a plurality of friction shoes on one governor weight, thereby providing means wherein the governor weight serves a plurality of friction shoes.

The invention also includes means for uniting the governor weights with the links or saddles so that when tightened, they serve as a solid casting. Also, the links or saddles are located on each side of the governor arm so that when they are removed, the friction shoes can be taken out between the spokes without dismantling the assembly.

These features are of primary importance in defining the invention to accomplish the means herein set forth in a simpler and better way than has been possible heretofore with other forms and constructions.

In the drawings forming a part of this specification:

Figure 1 is an outside side elevation view of the assembly of the clutch.

Figure 2 is a perspective view of one of the units of the working mechanism of the clutch where four parallel friction shoes are used.

Figure 3 is a sectional view indicated by the line 3—3 of Figure 1.

Figure 4 is a section of a detail taken on the line 4—4 of Figure 1.

Figure 7 is a sectional view indicated by the line 7—7 of Figure 5.

Figure 8 is an outside side elevational view of a clutch having a series of working units disposed in a single working plane in the clutch.

Figure 9 is a perspective view of one of the clutch shoe working units in the single row formation shown in Figure 8.

Figure 10 is a sectional view indicated by the line 10—10 of Figure 11.

Figure 11 is a sectional view indicated by the line 11—11 of Figure 8.

Figure 12 is a sectional view through the bell crank of Figure 8, indicated by the line 12—12.

Figure 13 is a perspective view of a working unit showing double brake shoes with a single weight.

Figure 5:
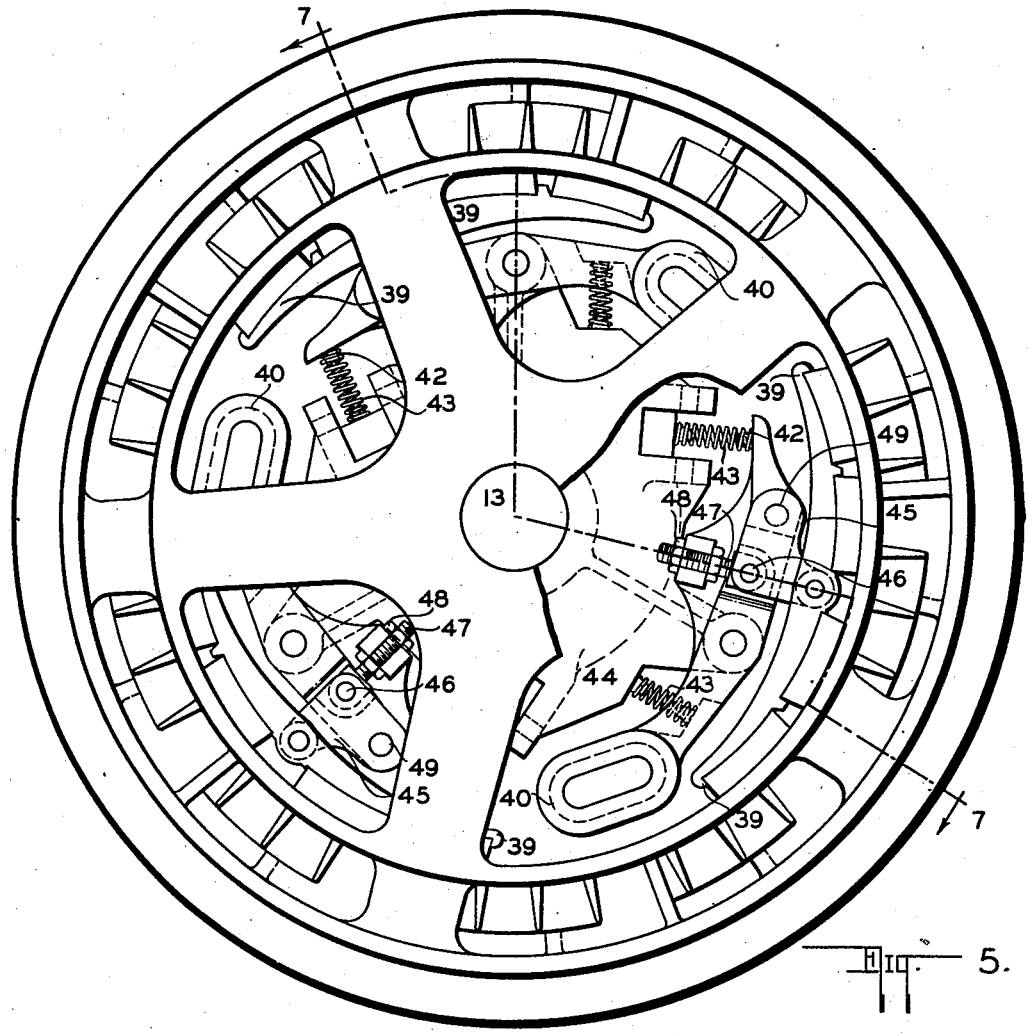
Figure 5 is a side elevational view of a clutch using working units with two parallel friction shoes.

Fig. 14 is a sectional view indicated by the line 14—14 of Fig. 13. Fig. 15 is an outside plan view of the assembly of the clutch. Fig. 16 is a sectional view through the clutch assembly as shown in Fig. 15.

In Figure 1 our clutch A is composed of an outside drum 10 and an inside drum 11 which are spaced by webs 12 and freely rotatably mounted to the drive shaft 13 by spokes 14 and the hub 14'. The outside drum 10 may be gear-cut or finished for any type of belt which may either be placed entirely across the outer surface of the drum, or in any position on the face of the drum. The spider 17 is rigidly connected to the shaft 13 by a key 18 and the spider 17 is therefore adapted to rotate at the constant speed of the shaft 13. Five evenly spaced lugs 17' are provided on the spider 17 to which governor levers 19 are pivoted. The governor levers 19 are each provided with a weight 20 at one end thereof and pins 21 at the other end which are adapted to support springs 22. The governor levers 19 are each provided with flanges 23 and 24. Adjustable bolt and nut means 25 are fastened to each of the flanges 23 and 24 and are also pivotally connected to adjusting links 26. The adjusting links 26 are in turn pivoted to the internal points 27 of the clutch shoes 28. At one end of each of the governor weights pins 29 are provided which engage springs 30 which in turn are engaged by pins 31 mounted to the spider 17. Thus the clutch shoes 28 are kept from coming in contact with the spider 17 while at rest or in rotation.

The outer drum 10 operates as a loose pulley and the spider 17, which is attached to the shaft 13, is brought into the desired speed by manually engaging the clutch shoes 28 with the friction drum 11. The governor levers 19 are floatingly supported by the spring 30 so as to avoid friction drag when the shaft is at rest.

In the sectional view of Figure 4, we show a working bell crank 32 which is pivoted at 33 to the web 34 of the spider 17. An equalizer 36 is pivoted at 35 to the bell crank 32. A plate 37 is provided which is adapted to come in contact with the bell crank 32 at a point 38. When the plate 37 bears against the bell crank 32, the bell crank is pivoted at 33 and the equalizer 36 is directed outward at an angle of 90° from the plate 37. On the equalizer 36 are mounted springs 22 which are held in place on the governor weight 19 by the pins 21 which are mounted at the end of the weight. Therefore, when the plate 37 is put into operation, the equalizer forces the springs 22 to act upon the weight 19, thus putting into work the clutch shoes 28 against the inside drum 11. The amount of friction of the clutch shoes 28 against the inner drum 11 can thus be regulated by any amount of pressure applied by springs 22 against the governor weight. As the plate 37 is moved forward against the bell cranks 32, the springs 22 will be compressed which in turn will tend to force the weight arms outwardly, thereby increasing the friction of the clutch shoes 28 on the inside of the drum 11. By using the adjusting screws 25, the amount of friction between the clutch shoes 28 and the inside drum 11 can also be adjusted.

In Figure 5 we illustrate another form of our clutch. The chief difference between the clutch illustrated in Figure 1 and that illustrated in Figure 5, is that in Figure 5, our clutch consists of two parallel shoes 39. Figure 1 illustrates a clutch having two pairs of parallel brake shoes. We use a similar governor weight 40 which is provided with flanges 41. A pin 42 is provided at one end adapted to support a spring 43. We use a similar spider 44 which has three webs instead of five webs like that used in the previous clutch in Figure 1. An adjusting link 45 is provided which is pivoted at 46 to an adjusting screw 47 and which in turn is supported by the flange 41 by means of nuts 48. Thus by means of the nuts 48, the friction of the frictional shoes 49 against the inside drum can be adjusted.

Figure 6:
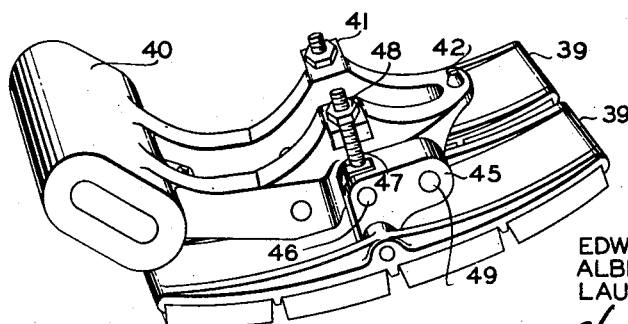
Figure 6 is a perspective view of one of the units of the mechanism of the moving parts of the clutch, having two parallel friction shoes.

The adjusting link 45 is pivoted at 49 to the governor weight 40. Therefore, as can be seen best in Fig. 6 the clutch shoes are pivoted to the links 45 in such a manner so that the clutch shoe will always tend to remain in the same position with respect to the governor weight regardless of any angular change of the adjusting link when manually changed to compensate for friction wear, thus eliminating chattering in the clutch. The operation of the friction shoes 39 in Figure 6, is similar to that of the friction shoes 28 in Figure 1.

In Fig. 8 of the drawings we illustrate still another form of our clutch, however, in this form we illustrate a single row of clutch shoe units, each unit having but one shoe.

In Figure 9 we show a perspective view of one of the clutch shoe units, illustrating the linkage of the governor weight 50 to the single clutch shoe 51. Like the other two pulleys already described, we have a similar operation of the moving parts. The governor weight 50 is pivoted at 52 to the spider 53 which is rotated with the shaft 66. At one end of the governor weight we provide a pivot 54 to which an adjusting link 55 is pivoted. The friction shoe 51 is pivotally secured at 56 to the adjusting link 55. The adjusting link 55 is pivoted to the governor weight at 54 and is also held in place to governor weight 50 by nuts 58 (see Figure 10).

In Figure 12 we show a bell crank 59 which is pivotally secured at 60 to the web 61 of the spider 53. A plate 37, a portion of which is shown in Figure 12 and which is more fully disclosed in Fig. 16, works against the frictional surface 62 of the bell crank 59 and tends to pivot the crank 59. A projection point 63 is provided on the bell crank 59 which is adapted to support a spring 64. The spring 64 comes in contact against the governor weight 50 at a projection point 65. Thus when the bell crank 59 is acted upon by the plate 37, the spring 64 exerts a force upon the governor weight 50, thus putting into operation the clutch shoes 51 against the inside drum. Friction pressure changes may be made if desired, by manually changing the position of the plate 37 to increase or decrease the pressure against the bell crank 59. This may be done while the mechanism is at rest or in motion.

The adjusting nuts 58 are used only to effect take-up for wear and they can only be manipulated when the clutch is at rest. The function of the adjusting nuts 58 is to compensate for wear. At one end of the governor weight we provide a projection point which is adapted to hold the spring 67. The spring 67 is held in contact with the spider at a point 68. Thus by means of the spring 67 the governor weight is held free to avoid friction drag.

In Figs. 15 and 16 we show the plate 37 more in detail and the mechanism for actuating the same. An expanding cam 76 is provided on the shaft 13 to slide the plate 37 toward or away from the bell crank 59 to actuate the bell crank. A collar 77 is mounted on the shaft 13 and secured firmly in place thereto by means of a set screw 78. The cam 76 comprises two parts 79 and 80 which may be urged apart or away from each other by relative rotation of these parts. Cam surfaces 81, as best illustrated in Fig. 15 of the drawings, are provided on the cam sections 79 and 80 so that by rotating the cam section 79 relative to the cam section 80, the cam may be expanded in an axial direction. A coil spring 83 is positioned on the inside of the plate 37 which tends to move the plate or to keep the plate in engagement with the cam 76. The cam portions 79 and 80 are mounted on antifriction bearings 82 so that the cam need not rotate with the shaft 13.

Our clutch will remain at a substantially constant speed regardless of the load it is carrying. When the outside load on the shaft changes, the friction between the friction shoes and the inside drum 69 changes, inasmuch that a reduction of speed will cause the governor weights to change the pressure on the shoes, thus regulating the force exerted on the shaft.

When the rotation of the shaft is slowed down the centrifugal force is less, and therefore, the governor weights tend to move inwardly and the friction shoes move outwardly, thus increasing the friction between the friction shoes and the inner drum. Between the inside drum 69 of Figure 8, and an outside drum 70 also in Figure 8, we provide fins or vanes 71 which have a tendency to force air between the inside drum 69 and the outside drum 70 and increase radiating surface, thus having a tendency to keep the inside drum 69 cool regardless of the friction which is exerted on it by the friction shoes 51. In Fig. 13 we illustrate a perspective view of a pair of clutch shoes attached to a single governor weight means. As shown in Fig. 14 the working parts of the arrangement shown in Fig. 13 are identical to that shown and described in Fig. 2. With reference to Fig. 14 we show a pair of clutch shoes 51 which are pivotally connected by means of pins 56' to a single adjusting link 55'. An adjusting bolt 57' having an enlarged head portion 72 is pivotally connected to the adjusting link 55' by means of a pin 73 which extends through a pair of ears 74 of the adjusting link and through the bolt head portion 72.

We claim:

1. A variable speed device, a pulley casing, a shaft upon which said pulley casing is adapted to freely rotate, friction shoes engageable with said pulley casing, a supporting means mounted upon said shaft for rotation therewith, weighted lever means, said weighted lever means pivotally supported to said supporting means, adjustable link means, said adjustable link means pivotally connecting said friction shoes to the free end of said weighted lever means, bell crank operating means pivotally supported to said supporting means, spring means interposed between the free end of said weighted lever means and said bell crank operating means, and said spring means transmitting pressure from said bell crank to the free end of said weighted lever.

2. A variable speed clutch including a pulley casing having a central bearing, a shaft freely rotatable within said bearing, a supporting means mounted upon said shaft for rotation therewith, a series of working units pivotally supported to said supporting means, each unit including a series of friction shoes, weight lever means for balancing said shoes, adjustable link means, said adjustable link means pivotally connecting said friction shoes to the free end of the weight lever means, bell crank operating means pivotally supported to said supporting means, spring means interposed between the free end of said weight means and said bell crank operating means, a plate adapted to contact said bell crank operating means, and said plate adapted to transmit pressure to said bell crank operating means, whereby said bell crank exerts pressure against said spring means which in turn transmits pressure to the free end of said weighted lever, whereby the friction shoes are forced against said pulley casing.

EDWIN M. FERGUSON.
ALBERT W. BARTON.
LAURANCE F. McCRADY.